(12) United States Patent
Chandrasekharan et al.

(10) Patent No.: US 8,191,135 B2
(45) Date of Patent: May 29, 2012

(54) SECURED WEB BASED ACCESS OF FAILED FLOWS IN AN INTEGRATION SERVER

(75) Inventors: Sivakumar Chandrasekharan, Alameda, CA (US); Senthil Gunasekaran, Santa Clara, CA (US)

(73) Assignee: International Business Machines Corporation, Armonk, NY (US)

( * ) Notice: Subject to any disclaimer, the term of this patent is extended or adjusted under 35 U.S.C. 154(b) by 1133 days.

(21) Appl. No.: 11/040,151

(22) Filed: Jan. 20, 2005

(65) Prior Publication Data

US 2006/0161801 A1      Jul. 20, 2006

(51) Int. Cl.
*G06F 12/14* (2006.01)
(52) U.S. Cl. ......................................................... 726/17
(58) Field of Classification Search ...................... 726/17
See application file for complete search history.

(56) References Cited

U.S. PATENT DOCUMENTS

| | | | |
|---|---|---|---|
| 5,911,143 A * | 6/1999 | Deinhart et al. ...................... 1/1 |
| 6,272,542 B1 | 8/2001 | Barnes et al. | |
| 6,473,407 B1 | 10/2002 | Ditmer | |
| 6,715,097 B1 | 3/2004 | Kidder et al. | |
| 6,727,927 B1 | 4/2004 | Dempski et al. | |
| 6,779,028 B1 * | 8/2004 | Nakamura .................... 709/223 |
| 2001/0027446 A1 * | 10/2001 | Metcalfe ......................... 705/67 |
| 2002/0062205 A1 * | 5/2002 | Roberts ......................... 702/188 |
| 2002/0073356 A1 * | 6/2002 | Katayama et al. ................. 714/4 |
| 2002/0184101 A1 * | 12/2002 | Gidadhubli et al. ............ 705/26 |
| 2002/0199123 A1 * | 12/2002 | McIntyre et al. ............. 713/202 |
| 2004/0006550 A1 * | 1/2004 | Upton ............................... 707/1 |

* cited by examiner

*Primary Examiner* — Michael S McNally
(74) *Attorney, Agent, or Firm* — Samuel K. Simpson; Patent Ingenuity, P.C.

(57) ABSTRACT

A method for accessing failed events in an integrated server environment is disclosed. The method comprises providing a thin client in an application server within the environment, wherein the thin client provides role-based access to a failed event, and wherein the role-based access is based upon a user's ability to access critical data. A thin client referred to as the failed event manager aids the user via a web browser, to manage events that failed during an integration scenario. Apart from being web-based, the failed event manager application also provides role-based access wherein users with certain roles are restricted in their ability to access critical data. The web-based failed event manager uses the security of the underlying application server, thus providing a secure environment. A system and method in accordance with the present invention takes advantage of the distributed computing capabilities of the underlying application server. As a result, remote users can simply log into the server via a web-portal from any location, and the familiar Windows environment is visually replicated on the screen. Moreover, a thin client provides higher security as all data including logs are stored and backed up only on the server. Thin clients lessen the danger to confidential information as no data is stored locally.

18 Claims, 9 Drawing Sheets

300

Address http://xxxxxxxxxxxxx

WebSphere

Login to Application Server

User Name:

Password:

Log In

Address [http://xxxxxxxxxxxx]

WebSphere

These are the basic possible roles available to a user:

Administrator : Has all rights to view as well as execute failed events.
ViewAll      : Has rights to only view events and business object data.
ViewEvents   : Has rights to only view events. Cannot view business object data.
SubmitEvents : Has rights to only view and resubmit events. Cannot view business object data.

You are logged in as a remote user Administrator in session 783E5690EJBA17C409136FE32.

Your user principal name is Administrator.

You have been granted role Administrator.

To check whether your username has been granted a particular role, enter it here:
[Administrator]

FIG. 7

Table of Failed Events
Now showing failed events 1 to 5 of 17.

| Status | Point of Failure | Connector | Business Object | Time | Message | Key[s] | Details |
|---|---|---|---|---|---|---|---|
| ☐ | Failed | SourceToDest | SourceConnector | CUSTOMER2.Create | 2003-11-11 14:36:02 55 | Error 11065 Collaboration Expt | CUST_ID=0 | View |
| ☐ | Failed | SourceToDest | SourceConnector | CUSTOMER2.Create | 2003-11-11 14:50:30 31 | Error 11065 Collaboration Expt | CUST_ID=3 | View |
| ☐ | Failed | SourceToDest | SourceConnector | CUSTOMER2.Create | 2003-11-11 14:36:03 74 | Error 11065 Collaboration Expt | CUST_ID=0 | View |
| ☐ | Failed | SourceToDest | SourceConnector | CUSTOMER2.Create | 2003-11-11 14:36:06 59 | Error 11065 Collaboration Expt | CUST_ID=1 | View |
| ☐ | Failed | SourceToDest | SourceConnector | CUSTOMER2.Create | 2003-11-11 14:37:10 48 | Error 11065 Collaboration Expt | CUST_ID=15 | View |

(Submit) (Refresh & Submit) (Cancel Waiting) (Delete)

*FIG. 8*

| Address | http://xxxxxxxxxx |

WebSphere

Table of Failed Events
Now showing failed events 1 to 5 of 20.

| | Status | Point of Failure | Connector | Business Object | Time | Message | Key[s] | Details |
|---|---|---|---|---|---|---|---|---|
| ☐ | Failed | AutoTestTransCollabObj | AutoTestConnector | SimpleBO.Create | 2003-11-11 14:36:02 55 | ◁▷ Error 11065 Collaboration Expt | ID=564 | View |
| ☐ | Failed | AutoTestTransCollabObj | AutoTestConnector | SimpleBO.Create | 2003-11-11 14:36:02 55 | ◁▷ Error 11065 Collaboration Expt | ID=23 | View |
| ☐ | Failed | AutoTestTransCollabObj | AutoTestConnector | SimpleBO.Create | 2003-11-11 14:36:02 55 | ◁▷ Error 11065 Collaboration Expt | ID=24 | View |
| ☐ | Failed | AutoTestTransCollabObj | AutoTestConnector | SimpleBO.Create | 2003-11-11 14:36:02 55 | ◁▷ Error 11065 Collaboration Expt | ID=25 | View |
| ☐ | Failed | AutoTestTransCollabObj | AutoTestConnector | SimpleBO.Create | 2003-11-11 14:36:02 55 | ◁▷ Error 11065 Collaboration Expt | ID=26 | View |

◁ ☐ ☐ ☐ ☐ ☐ ▷

(Submit) (Refresh & Submit) (Delete)

*FIG. 9*

200
SECURED WEB BASED ACCESS OF FAILED FLOWS IN AN INTEGRATION SERVER

FIELD OF THE INVENTION

The present invention relates generally to a server environment and more particularly to a system and method for accessing failed events in such an environment.

BACKGROUND OF THE INVENTION

Enterprise Integration server platforms allow for integration across discrete applications. Application changes from a source application are propagated to one or more target applications. A typical Integration scenario would be a multi-step operation and could possibly encounter various types of failures. In a real-time setup, such failures are collected and processed at a later time to avoid costly delays. The server platform allows for collection of such failed flows and allows user inspection of the data associated. The user analyzes the failure based on:

(a) Data and meta-data associated with the failed flow;
(b) Nature of the error encountered;
(c) Component or components which raised the error; and
(d) Date and time at which the failure occurred.

A suitable course of action is chosen by the user to resolve the failures. This process normally requires manual intervention and cannot be automated. Today the integration server platform typically utilizes a Windows based graphical user interface (GUI) application that allows for such analysis and remedial actions. This approach has several shortcomings, including:

(a) Inability to differentiate between Administrator and end-user;
(b) Location restrictions;
(c) Non availability of integrated security mechanisms as any user with access to an integration server would be able to view and manage all critical data;
(d) Native operating system and software dependencies;
(e) Lack of user defined roles; and
(f) Resource usage.

Accordingly, what is needed is a client administration tool that is integrated with the server platform, is not restricted to a specific location, and is not specific to a particular environment. The system and method should be adaptable and easily implemented on existing server platforms. The present invention addresses such a need.

SUMMARY OF THE INVENTION

A method for accessing failed events in an integrated server environment is disclosed. The method comprises providing a thin client in an application server within the environment, wherein the thin client provides role-based access to a failed event, and wherein the role-based access is based upon a user's ability to access critical data.

A thin client, referred to as the failed event manager, aids the user via a web browser to manage events that failed during an integration scenario. Apart from being web based, the failed event manager application also provides role-based access wherein users with certain roles are restricted in their ability to access critical data. The web based failed event manager uses the security of the underlying application server, thus providing a secure environment.

A system and method in accordance with the present invention takes advantage of the distributed computing capabilities of the underlying application server. As a result, remote users can simply log into the server via a web-portal from any location, and the familiar Windows-based environment is visually replicated on the screen. Moreover, a thin client provides higher security as data including logs are stored and backed up only on the server. Thin clients lessen the danger to confidential information as no data is stored locally.

BRIEF DESCRIPTION OF THE DRAWINGS

FIG. 4 illustrates the Application server login page.
FIG. 6 illustrates the Query page.
FIG. 7 illustrates the process of checking access rights.
FIG. 8 illustrates the result page.
FIG. 9 illustrates a Table of Failed Events page.

DETAILED DESCRIPTION

The present invention relates generally to a server environment and more particularly to a system and method for accessing failed events in such an environment. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

A web-based failed event manager in accordance with a preferred embodiment of the present invention is a thin client that aids the user via a web browser to manage events that failed during an integration scenario. The web-based failed event manager in part uses the security of the underlying application server, thereby providing a secure environment. Apart from being web-based, the failed event manager also provides role-based access wherein users with certain roles are restricted in their ability to access critical data. The level of granularity provided for a role is quite high. Access may be restricted based on:

(1) Point of Failure of the event;
(2) Name of the source adapter;
(3) Name of the Business Object; or
(4) Key values of the Business Object.

As a result, certain users, based on their respective roles, would be restricted in their ability to manage or view critical data thereby differentiating between an administrator and end-user. Some other users may be able to resolve the failed events, but may not be allowed to view the critical data associated with the failed events. For example, when an event with payroll information encounters a failure, only a user with a particular role may be able to access or view that event. Other users may be restricted to just viewing events that do not contain payroll information.

A method and system in accordance with a preferred embodiment of the present invention do not have location-based restrictions. Since it is web-based, the user may view the data from any remote location by using the browser. Moreover, there are no dependencies on the underlying operating system, and the memory footprint is low. It should be also understood that the present invention can be implemented in devices using program instructions from a computer readable medium such as a floppy disk, CD, DVD, or flash memory, or could be downloadable via a public network such as the Internet.

Figure 1:
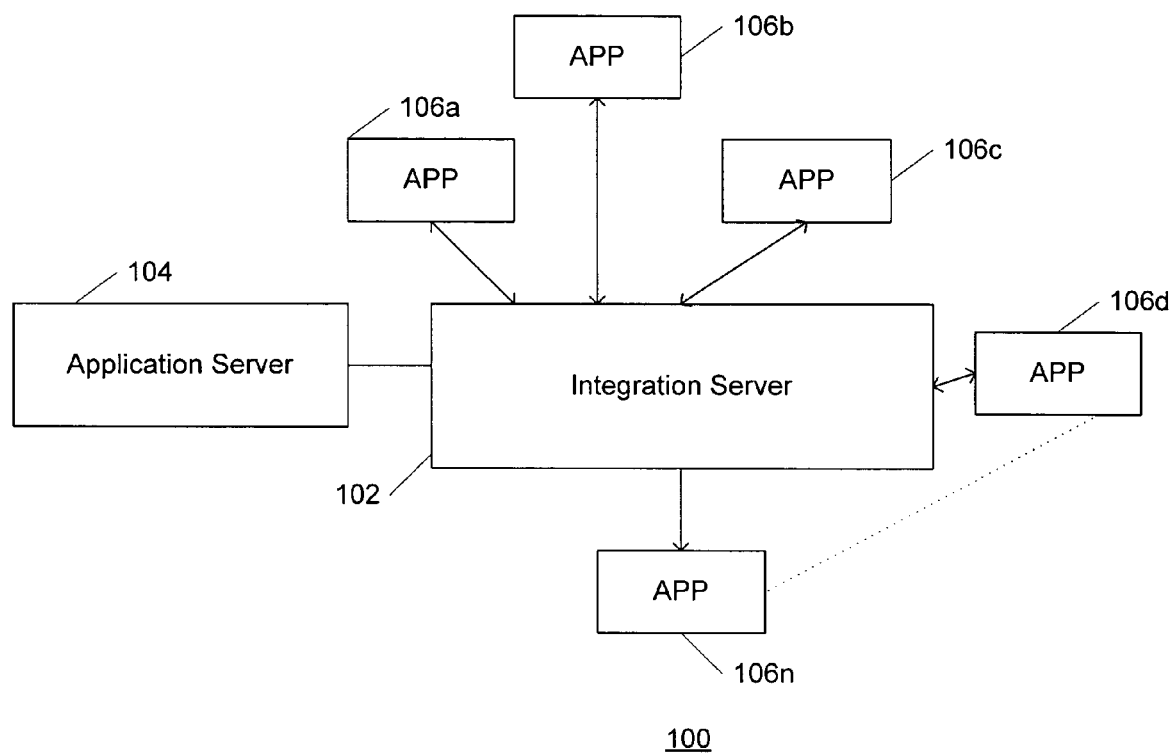
FIG. 1 is a block diagram of a server environment in accordance with a preferred embodiment of the present invention.

FIG. 1 is a block diagram of a server environment 100 in accordance with a preferred embodiment of the present invention. The server environment 100 includes an integration server 102, an application server 104, and a plurality of applications, APPs 106a-n. In this environment, changes from a source application are propagated to one or more target applications. A typical integration scenario would be a multi-step operation and could possibly encounter various types of failures. In a real-time setup, such failures are collected and processed at a later time to avoid costly delays. A server environment in accordance with the preferred embodiment of the present invention allows for collection of such failed flows and allows user inspection of the data associated by utilizing a thin client that is integrated within the platform.

To describe the features of the preferred embodiment of the present invention in more detail, refer now to the following discussion on conjunction with the accompanying Figures.

Figure 2:
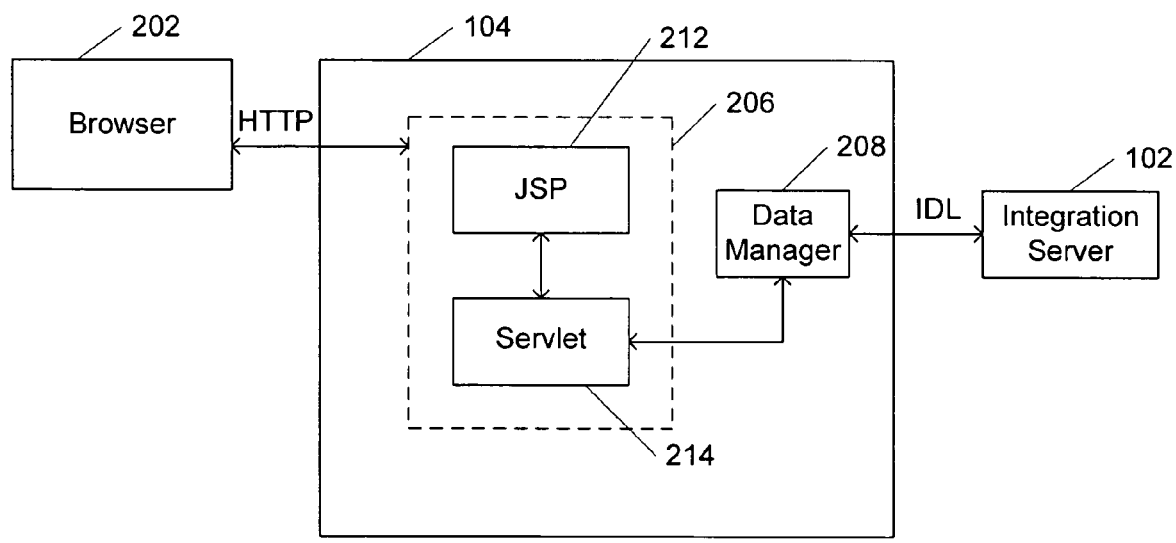
FIG. 2 is a block diagram of the server mechanism for providing control for a user in response to a failed event in accordance with a preferred embodiment of the present invention.

FIG. 2 is a block diagram of the server mechanism for providing control for a user in response to a failed event in accordance with the preferred embodiment of present invention. The mechanism includes a web browser 202, the application server 104 such, as a Websphere application server, and the integration server 102. The application server 104 includes a failed event manager 206 and a Data Manager 208. The failed event manager 206 includes a Java Server Page (JSP) 212 and a Java Servlet 214.

The web-based failed event manager 206 allows for access control wherein certain users may be restricted from performing certain tasks on the failed events. In order to provide this sort of access control mechanism, common security approaches provided by the web application framework will be utilized. These security approaches are described in detail hereinbelow.

Declarative Security

With declarative security, none of the individual servlets 214 or JSP pages 212 need any security aware code. Instead, both of the major security aspects are handled by the integration server 210.

Programmatic Security

With programmatic security, the protected servlets 214 and JSP pages 212 partially manage their own security. The failed event manager 206 uses the role-based authorization model with a combination of both declarative and programmatic security.

With the role-based authorization model, each user will be given a user name, password and a role. A deployment descriptor (web.xml) within the failed event manager 206 would contain information about each of these roles.

In a system and method in accordance with the preferred embodiment of the present invention, default roles can be provided in the failed event manager, or custom roles can be created. To describe these different role categories, refer now to the following discussion in conjunction with the accompanying figures.

Default Roles

By default, the installation of the failed event manager 206 provides these four basic roles:

1. Administrator: has all rights to view as well as execute failed events;

2. ViewAll: has rights to only view events and business object data;

3. ViewEvents: has rights to only view events. Cannot view business object data; and 4. SubmitEvents: has rights to only view and resubmit events. Cannot view business object data.

Figure 3:
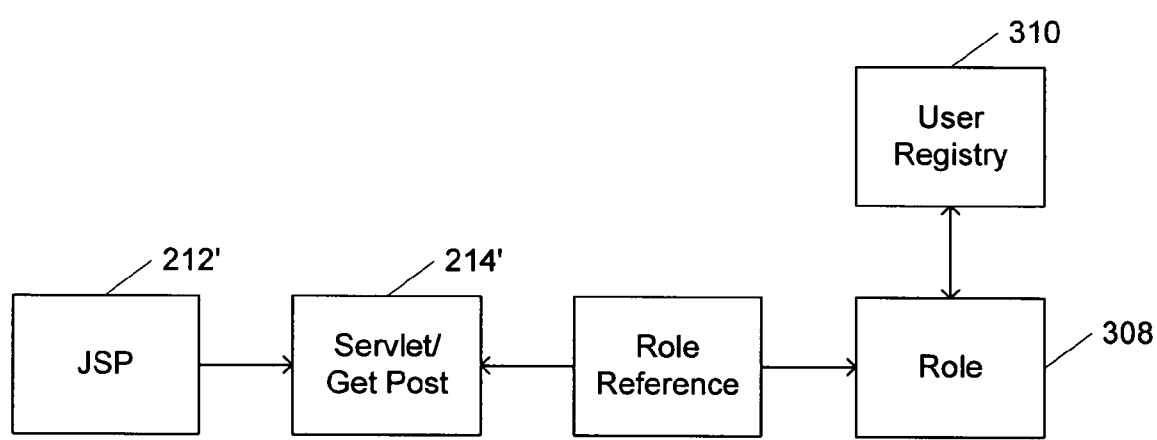
FIG. 3 is a block diagram which illustrates providing default roles in an application server within the JSP and servlet.

FIG. 3 is a block diagram which illustrates providing default roles in an application server within the JSP 212 and servlet 214. In a Websphere application server, for example, the authorization process is made simple by means of an Application Assembly Tool (AAT) (not shown).

Using the AAT, it is not only possible to assign users to roles, but also to assign user groups to roles. Users and user groups can be assigned to roles through the administrator console. This allows the administrator to grant and revoke access to roles without having to redeploy the application.

A more efficient model would be to assign each user group to a role 308. In this way, a user is allowed access to a role simply by virtue of their inclusion in that group. Creating and managing users can be performed entirely through user registry tools 310 in the administrator console.

Creating Custom Roles

Apart from the four default roles that are available, custom roles can also be created that provide compartment level access, i.e., a user with an appropriate role can be restricted to viewing failed events that:

1. Belong to a specific Event Owner (connector or collaboration);

2. Belong to a specific Source Adapter;

3. Contain a specific Business Object (with a specific verb); and

4. Contain a specific Business Object with specific key values.

In order to create custom roles, a parameter value needs to set in a web deployment description within the failed event manager. The parameter value could be, for example, (a string) of the format:

---

<RoleName 1>:event_owners=<ownername?"connectors=connectorName>*bos+<boname.verb>#<CompositeKeyValue>+<CompositeKeyValue2>/<AnotherPossibleKeyValue> | <RoleName>: . . .
< | > separates two roles
< : > separates role name from components of the role
< * > separates components within a role ex: connectors & box
< = > separates component name from its values
< , > separates values within a component
< # > separates business object name from its key values
< / > separates possible keys of a business object (same business object - different key)
< + > separates composite key of a business object (two or more primary keys)

---

Model View Controller Paradigm

The design of a web-based Flow Manager would follow a Model View Controller paradigm. The JSP 212 (FIG. 2) typically used for presentation would be the View. The servlets 214 that transfer information would be the Controller. The Data Manager 208 that takes care of the business logic would be the Model.

Application Server Login Page

FIG. 4 illustrates the Application server login page. After the application (for example, in the form of a war file) is deployed into the particular application server, a user with a particular role could access it by typing in the required URL from any remote location. If security is enabled, the first page the user sees after starting the application will be the application server which eventually provides access to the integration server login page. The user authentication is completely carried out by the application server as explained later.

ICS Login Page

Figure 5:
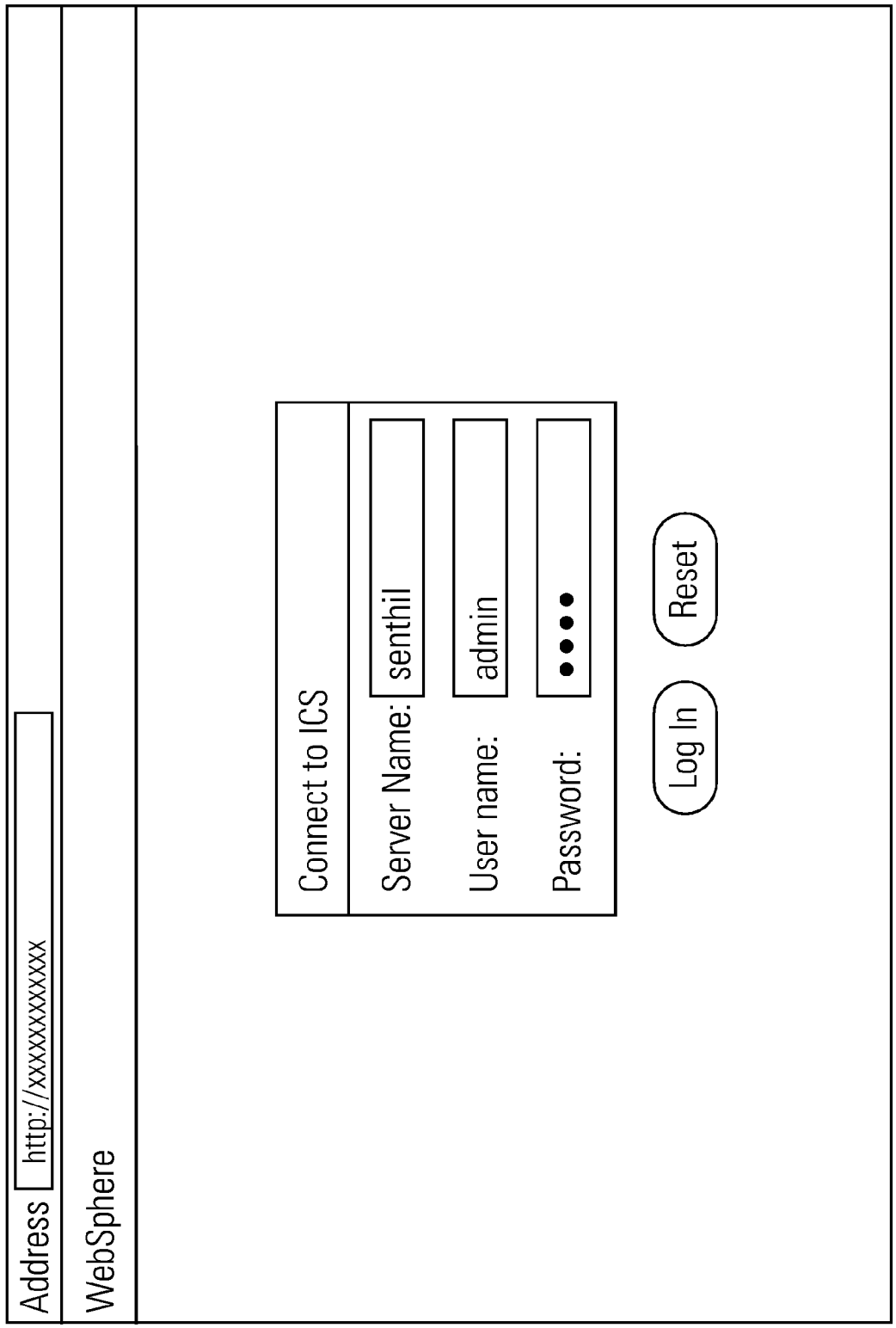
FIG. 5 illustrates the integration server login page.

FIG. 5 illustrates the integration server login page. The user sees the login page initially (however, if security is enabled, the user would see the application server login page), wherein the user would have to enter: (a) user name, (b) password and (c) server name.

Query Page

Figure 6:
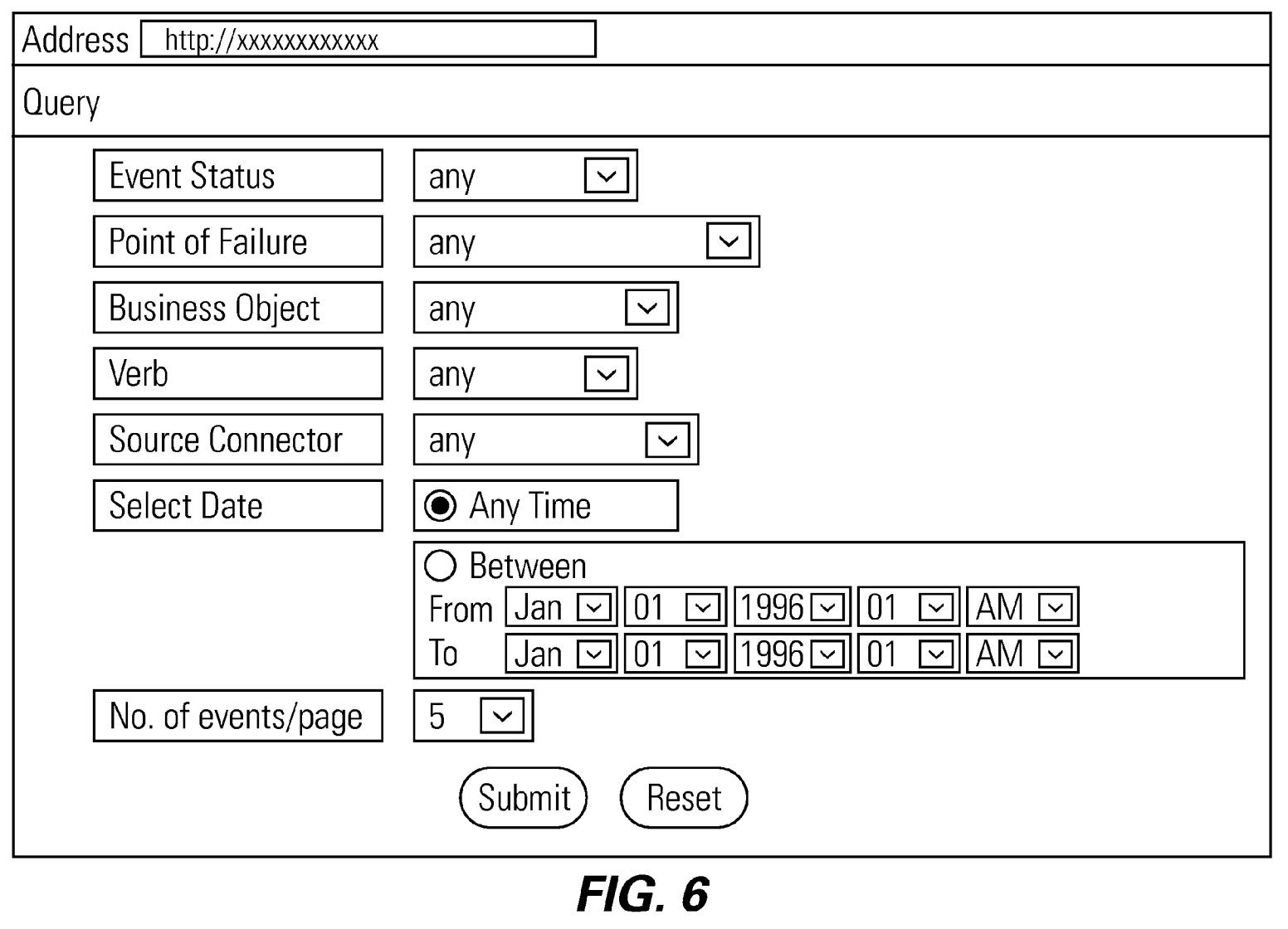

FIG. 6 illustrates the Query page. On successful login, the user is directed to the query page. The query page allows the user to set query parameters to submit a query to obtain failed events based on the query.

The different attributes on the query page could be, for example:

1. Event status—allows the user to select the status for unwanted events. The possible values could be as follows: (a) Any, (b) Failed, (c) In transit, (d) Possible duplicate, (e) Deferred, and (f) Waiting;
2. Point of Failure—It contains a combination box that is used to specify the Event Owner (i.e., the component in which the failure occurred);
3. Business Object—a combination box that helps filter out information based on the particular Business Object name;
4. Verb—a combination box that helps filter out information based on the particular Business Object's verb;
5. Source Connector—a combination box that helps filter out information based on the particular Source Connector; and
6. Date and Time—allows the user to filter out unfinished events created during a specific time frame.

It should be understood that although these specific attributes are described, a variety of attributes could be part of the query page and they would be within the spirit and scope of the present invention.

Checking Access Rights

FIG. 7 illustrates the process of checking access rights. A user could verify if he or she belongs to a particular role by clicking on the "Check your access rights" link on the bottom left corner of the query page. In this location, the user could type in a particular role name and click enter to see the results.

Result Page

FIG. 8 illustrates the result page. When the user submits a query, the result of the query will be shown in tabular form in the result page, typically 20 events per page.

1. Submit Button. When the user selects one or more events and clicks on the submit button, this sends the event(s) back to the destination application;
2. Refresh & Submit Button. Clicking on this button refreshes and submits the selected event(s);
3. Cancel Waiting Button. This cancels the waiting event(s) (long lived business processes); and
4. Delete Button. Deletes one or more selected events.

FIG. 9 illustrates a Table of Failed Events page. The button is clicked to show that the business object is disabled while the user can view all the failed events.

A web-based failed event manager in accordance with the preferred embodiment of the present invention is a thin client that aids the user via a web browser, to manage events that failed during an integration scenario. The web based failed event manager, in part uses the security of the underlying application server thereby providing a secure environment. Apart from being web based, the failed event manager also provides role-based access wherein users with certain roles are restricted in their ability to access critical data.

This product could prove quite useful in offloading of failed event administration to a particular department in a company. Usually companies have many departments/divisions under them. Previously, when there was a transaction that failed in an integration environment for a particular division A of company X the IT department of the main company had to login (due to fear of critical data being viewed by other divisions) and take care of the events that failed. Now, with the role based security, the IT department can offload managing failed events for a particular division. In this way, when a transaction relating to a particular division fails, an admin from that division could login to Failed Event Manager with limited access and just resolve that particular transaction. Thus the IT department of the main company need not be involved.

Although the present invention has been described in accordance with the embodiments shown, one of ordinary skill in the art will readily recognize that there could be variations to the embodiments, and those variations would be within the spirit and scope of the present invention. Accordingly, many modifications may be made by one of ordinary skill in the art without departing from the spirit and scope of the appended claims.

What is claimed is:

1. A method comprising:
providing a thin client in an application server within an integrated server environment such that critical data associated with a failed event and received by the thin client is stored only on the application server;
determining an access right of a user; and
providing to the user, through the thin client, access to the critical data associated with the failed event in the integrated server environment, including restricting the access based upon a point of failure of the event, name of a source adapter, or name and key values of a business object, the access based on the access right of the user.

2. The method of claim 1 wherein the access right of the user is determined according to a role that is associated with a user group of which the user is included.

3. The method of claim 2 wherein the role is a default role.

4. The method of claim 3 wherein the default role includes an administrator, View all, View Events, or Submit Events.

5. The method of claim 2 wherein the role is a custom role.

6. The method of claim 5 wherein the custom role provides compartmental level access to a failed event.

7. A computer readable device containing program instructions comprising:
providing a thin client in an application server within the integrated server environment such that critical data associated with a failed event and received by the thin client is stored only on the application server;
determining an access right of a user; and
providing to the user, through the thin client, access to the critical data associated with the failed event in the integrated server environment, including restricting the access based upon a point of failure of the event, name of a source adapter, or name and key values of a business object, the access based on the access right of the user.

8. The computer readable device of claim 7 wherein the access right of the user is determined according to a role that is associated with a user group of which the user is included.

9. The computer readable device of claim 8 wherein the role is a custom role.

10. The computer readable device of claim 7 wherein the role is a default role.

11. The computer readable device of claim 10 wherein the default role includes an administrator, View all, View Events, or Submit Events.

12. The computer readable device of claim 10 wherein the custom role provides compartmental level access to a failed event.

13. An application server comprising:
a data manager device that communicates with an integration server; and
a thin client device that communicates with the data manager such that critical data associated with a failed event and received by the thin client device is stored only on the application server, determines an access right of a user, and provides to the user, through the thin client device, access to the critical data associated with the failed event in the integrated server environment, including a restriction on the access based upon a point of failure of the event, name of a source adapter, or name and key values of a business object, the access based on the access right of the user.

14. The application server of claim 13 wherein the access right of the user is determined according to a role that is associated with a user group of which the user is included.

15. The application server of claim 14 wherein the role is a default role.

16. The application server of claim 15 wherein the default role includes an administrator, View all, View Events, or Submit Events.

17. The application server of claim 14 wherein the role is a custom role.

18. The application server of claim 17 wherein the custom role provides compartmental level access to a failed event.

* * * * *